US008954694B2

(12) United States Patent  
Tomlin et al.

(10) Patent No.: US 8,954,694 B2  
(45) Date of Patent: Feb. 10, 2015

(54) METHODS, DATA STORAGE DEVICES AND SYSTEMS FOR FRAGMENTED FIRMWARE TABLE REBUILD IN A SOLID STATE DRIVE

(71) Applicants: Western Digital Technologies, Inc., Irvine, CA (US); Skyera, Inc., San Jose, CA (US)

(72) Inventors: Andrew J. Tomlin, San Jose, CA (US); Justin Jones, Burlingame, CA (US); Rodney N. Mullendore, San Jose, CA (US)

(73) Assignees: Western Digital Technologies, Inc., Irvine, CA (US); Skyera, Inc., San Jose, CA (US)

( * ) Notice: Subject to any disclaimer, the term of this patent is extended or adjusted under 35 U.S.C. 154(b) by 81 days.

(21) Appl. No.: 13/677,704

(22) Filed: Nov. 15, 2012

(65) Prior Publication Data  
US 2014/0136753 A1  May 15, 2014

(51) Int. Cl.  
*G06F 12/00* (2006.01)

(52) U.S. Cl.  
USPC ........... 711/162; 711/103; 711/104; 711/156; 711/206; 711/221; 714/6.24; 714/768

(58) Field of Classification Search  
None  
See application file for complete search history.

(56) References Cited

U.S. PATENT DOCUMENTS

| | | | |
|---|---|---|---|
| 6,170,066 B1 | 1/2001 | See | |
| 6,594,183 B1 | 7/2003 | Lofgren et al. | |
| 6,850,443 B2 | 2/2005 | Lofgren et al. | |
| 6,856,556 B1 | 2/2005 | Hajeck | |
| 6,901,499 B2 | 5/2005 | Aasheim et al. | |
| 7,080,232 B2 | 7/2006 | Aasheim et al. | |
| 7,120,729 B2 | 10/2006 | Gonzalez et al. | |
| 7,126,857 B2 | 10/2006 | Hajeck | |
| 7,178,061 B2 | 2/2007 | Aasheim et al. | |
| 7,340,647 B2 | 3/2008 | Aasheim et al. | |
| 7,397,707 B2 | 7/2008 | Mokhlesi | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |

(Continued)

OTHER PUBLICATIONS

Search Report and Written Opinion from PCT/US2013/062765 filed Sep. 30, 2013, Applicant: Western Digital Technologies, Inc., 10 pages.

(Continued)

*Primary Examiner* — Shawn X Gu

(57) ABSTRACT

A data storage device comprises a plurality of non-volatile memory devices configured to store a plurality of physical pages; a controller coupled to the plurality of memory devices that is configured to program data to and read data from the plurality of memory devices. A volatile memory may be coupled to the controller and may be configured to store a firmware table comprising a plurality of firmware table entries. The controller may be configured to maintain a plurality of firmware journals in the non-volatile memory devices. Each of the firmware journals may be associated with a firmware table entry and may comprise firmware table entry information. The controller may be configured to read the plurality of firmware journals upon startup and rebuild the firmware table using the firmware table entry information in each of the read plurality of firmware journals.

23 Claims, 9 Drawing Sheets

(56) References Cited

U.S. PATENT DOCUMENTS

| | | | |
|---|---|---|---|
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B1 | 4/2012 | Diggs et al. | |
| 8,194,340 B1 | 6/2012 | Boyle et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 2003/0156473 A1* | 8/2003 | Sinclair et al. | 365/200 |
| 2007/0101095 A1* | 5/2007 | Gorobets | 711/203 |
| 2007/0204128 A1 | 8/2007 | Lee et al. | |
| 2008/0104308 A1 | 5/2008 | Mo et al. | |
| 2009/0007089 A1* | 1/2009 | Rothman et al. | 717/168 |
| 2009/0138650 A1* | 5/2009 | Lin et al. | 711/103 |
| 2009/0222636 A1* | 9/2009 | Yano et al. | 711/166 |
| 2009/0240873 A1 | 9/2009 | Yu et al. | |
| 2010/0174849 A1 | 7/2010 | Walston et al. | |
| 2010/0174851 A1 | 7/2010 | Leibowitz et al. | |
| 2010/0250793 A1 | 9/2010 | Syu | |
| 2010/0268871 A1 | 10/2010 | Lee et al. | |
| 2011/0055458 A1 | 3/2011 | Kuehne | |
| 2011/0099323 A1 | 4/2011 | Syu | |
| 2011/0283049 A1 | 11/2011 | Kang et al. | |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2013/0132638 A1 | 5/2013 | Horn et al. | |
| 2013/0145106 A1 | 6/2013 | Kan | |
| 2013/0290793 A1 | 10/2013 | Booth et al. | |
| 2014/0059405 A1 | 2/2014 | Syu et al. | |
| 2014/0101369 A1 | 4/2014 | Tomlin et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |
| 2014/0149826 A1 | 5/2014 | Lu et al. | |
| 2014/0157078 A1 | 6/2014 | Danilak et al. | |
| 2014/0181432 A1 | 6/2014 | Horn | |
| 2014/0223255 A1 | 8/2014 | Lu et al. | |

OTHER PUBLICATIONS

Jerry Lo, et. al., U.S. Appl. No. 13/468,946, filed May 10, 2012, 29 pages.

Lyndon S. Chiu, et. al., U.S. Appl. No. 12/974,234, filed Dec. 21, 2010, 18 pages.

Jerry Lo, et. al., U.S. Appl. No. 13/470,206, filed May 11, 2012, 30 pages.

* cited by examiner

| L-PAGE # | | | | E-PAGES NEEDED |
|---|---|---|---|---|
| L-Page 1 = | E-Page 1003 | Offset 800 | Len 1,624 | 1003,1004 |
| L-Page 2 = | E-Page 1004 | Offset 400 | Len 696 | 1004 |
| L-Page 3 = | E-Page 1004 | Offset 1120 | Len 4,096 | 1004, 1005, 1006 |
| L-Page 4 = | E-Page 1006 | Offset 1144 | Len 3,128 | 1006, 1007, 1008 |

METHODS, DATA STORAGE DEVICES AND SYSTEMS FOR FRAGMENTED FIRMWARE TABLE REBUILD IN A SOLID STATE DRIVE

BACKGROUND

Due to the nature of flash memory in solid state drives (SSDs), data is typically programmed by pages and erased by blocks. A page in an SSD is typically 8-16 kilobytes (KB) in size and a block consists of a large number of pages (e.g., 256 or 512). Thus, a particular physical location in an SSD (e.g., a page) cannot be directly overwritten without overwriting data in pages within the same block, as is possible in a magnetic hard disk drive. As such, address indirection is needed. Conventional data storage device controllers, which manage the flash memory on data storage devices such as SSDs and interface with the host system, use a Logical-to-Physical (L2P) mapping system known as Logical Block Addressing (LBA) that is part of the Flash Translation Layer (FTL). When new data comes in replacing older data already written, the data storage device controller causes the new data to be written in a new location and update the logical mapping to point to the new physical location. Since the old physical location no longer holds valid data, it will eventually need to be erased before it can be written again.

Conventionally, a large L2P map table maps logical entries to physical address locations on an SSD. This large L2P map table, which may reside in a volatile memory such as dynamic random access memory (DRAM), is usually updated as writes come in, and saved to non-volatile memory in small sections. For example, if random writing occurs, although the system may have to update only one entry, it may nonetheless have to save to the non-volatile memory the entire table or a portion thereof, including entries that have not been updated, which is inherently inefficient.

FIG. 1 shows aspects of a conventional Logical Block Addressing (LBA) scheme for an SSD. As shown therein, a map table 104 contains one entry for every logical block 102 defined for the data storage device's flash memory 106. For example, a 64 GB SSD that supports 512 byte logical blocks may present itself to the host as having 125,000,000 logical blocks. One entry in the map table 104 contains the current location of each of the 125,000,000 logical blocks in the flash memory 106. In a conventional SSD, a flash page holds an integer number of logical blocks (i.e., a logical block does not span across flash pages). In this conventional example, an 8 KB flash page would hold 16 logical blocks (of size 512 bytes). Therefore, each entry in the logical-to-physical map table 104 contains a field 108 identifying the flash die on which the logical block is stored, a field 110 identifying the flash block on which the logical block is stored, another field 112 identifying the flash page within the flash block and a field 114 identifying the offset within the flash page that identifies where the logical block data begins in the identified flash page. The large size of the map table 104 prevents the table from being held inside the SSD controller. Conventionally, the large map table 104 is held in an external DRAM connected to the SSD controller. As the map table 104 is stored in volatile DRAM, it must be restored when the SSD powers up, which can take a long time, due to the large size of the table.

When a logical block is read, the corresponding entry in the map table 104 is read to determine the location in flash memory to be read. A read is then performed to the flash page specified in the corresponding entry in the map table 104. When the read data is available for the flash page, the data at the offset specified by the map entry is transferred from the SSD to the host. When a logical block is written, the corresponding entry in the map table 104 is updated to reflect the new location of the logical block. It is to be noted that when a logical block is written, the flash memory will initially contain at least two versions of the logical block; namely, the valid, most recently written version (pointed to by the map table 104) and at least one other, older version thereof that is stale and is no longer pointed to by any entry in the map table 104. These "stale" data are referred to as garbage, which occupies space that must be accounted for, collected, erased and made available for future use.

During normal operations, SSDs generate firmware information (e.g., non-user data) that must be saved. Such information is essentially overhead data. For example, when the SSD opens or closes a block, some data is generated and must be saved. Often, such firmware information is stored in table form. For example, a given table may have 2048 entries, with each entry being 8 bytes in size. Therefore, such a table occupies about 16 KB of storage space/memory. Therefore, each time a new block is opened, this information is saved by the system, which conventionally requires carrying out a 16 KB write. Conventionally, such tables are stored in a firmware physical file system (e.g., Firmware File System) that is different from the file system for storing user data (e.g., File Storage System). Such a Firmware File System is conventionally located in a separate area of the non-volatile memory, and reads and writes to that Firmware File System are conventionally handled differently than are normal reads/writes of user data. Such dual file systems for firmware data and user data increase the overhead of the system and engender coherency challenges that require complex solutions.

DETAILED DESCRIPTION

System Overview

Figure 1:
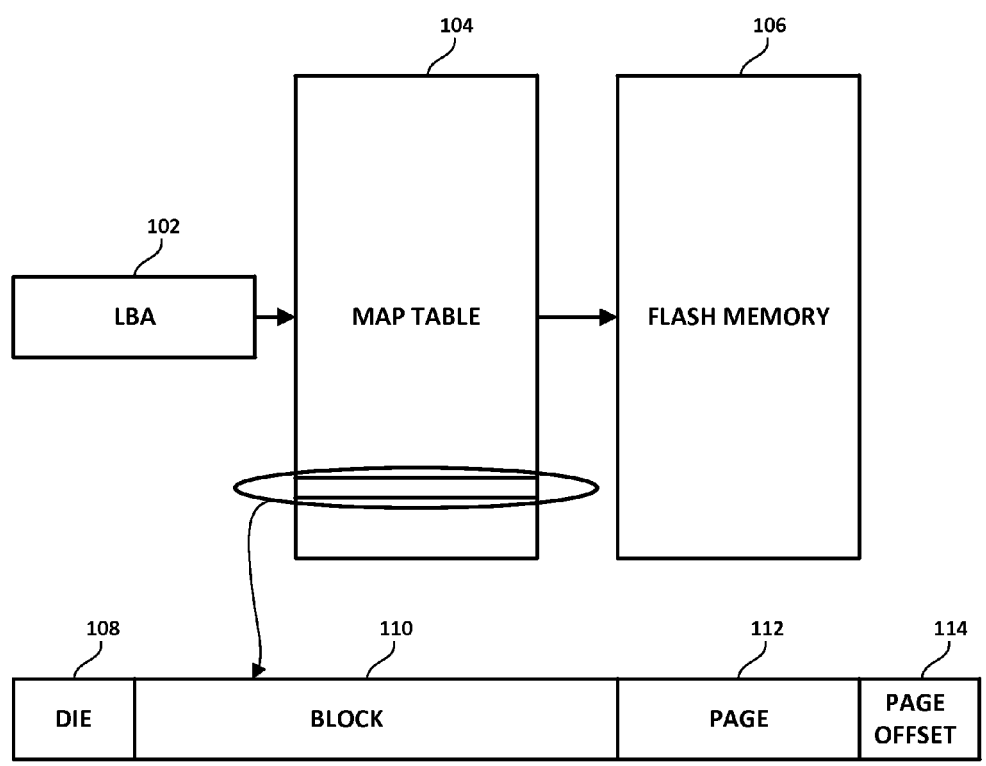
FIG. 1 shows aspects of a conventional Logical Block Addressing (LBA) scheme for SSDs.
Figure 2:
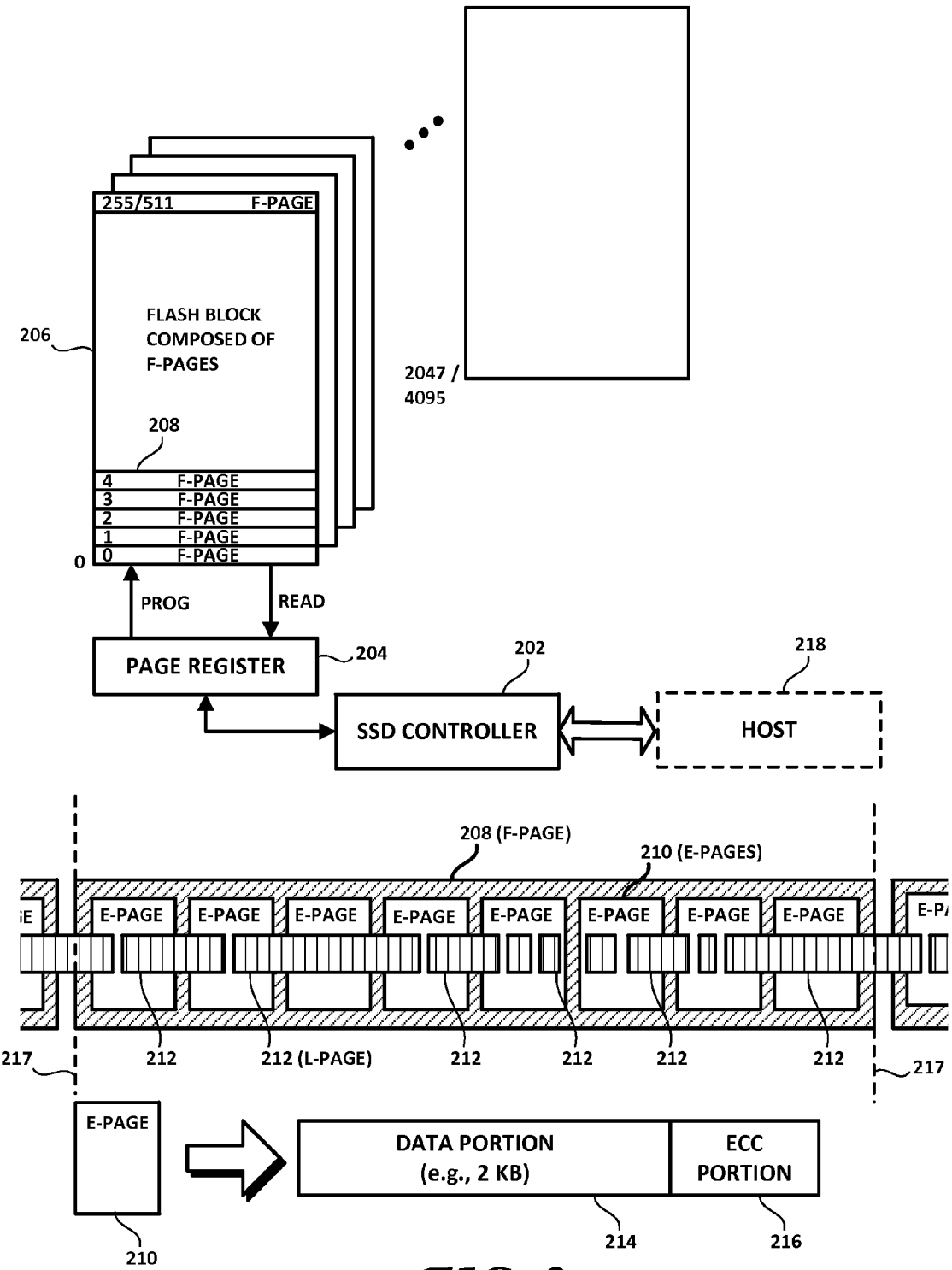
FIG. 2 is a diagram showing aspects of the physical and logical data organization of a data storage device according to one embodiment.

FIG. 2 is a diagram showing aspects of the physical and logical data organization of a data storage device according to one embodiment. In one embodiment, the data storage device is an SSD. In another embodiment, the data storage device is a hybrid drive including Flash memory and rotating magnetic storage media. The disclosure is applicable to both SSD and hybrid implementations, but for the sake of simplicity the various embodiments are described with reference to SSD-based implementations. A data storage device controller 202 according to one embodiment may be configured to be coupled to a host, as shown at reference numeral 218. The host 218 may utilize a logical block addressing (LBA) scheme. While the LBA size is normally fixed, the host can vary the size of the LBA dynamically. For example, the physical data storage device may be logically portioned to support partitions configured for LBAs of different sizes. However, such partitions are not required for the physical device to support LBAs of different sizes at the same time. For example, the LBA size may vary by interface and interface mode. Indeed, while 512 bytes is most common, 4 KB is also becoming more common, as are 512+(520, 528 etc.) and 4 KB+(4 KB+8, 4K+16 etc.) formats. As shown therein, the data storage device controller 202 may comprise or be coupled to a page register 204. The page register 204 may be configured to enable the controller 202 to read data from and store data to the data storage device. The controller 202 may be configured to program and read data from an array of Flash memory devices responsive to data access commands from the host 218. While the description herein refers to Flash memory generally, it is understood that the array of memory devices may comprise one or more of various types of non-volatile memory devices such as Flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The page register 204 may be configured to enable the controller 202 to read data from and store data to the array. According to one embodiment, the array of Flash memory devices may comprise a plurality of non-volatile memory devices in die (e.g., 128 dies), each of which comprises a plurality of blocks, such as shown at 206 in FIG. 2. Other page registers 204 (not shown), may be coupled to blocks on other die. A combination of Flash blocks, grouped together, may be called a Superblock or S-Block. In some embodiments, the individual blocks that form an S-Block may be chosen from one or more dies, planes or other levels of granularity. An S-Block, therefore, may comprise a plurality of Flash blocks, spread across one or more die, that are combined together. In this manner, the S-Block may form a unit on which the Flash Management System (FMS) operates. In some embodiments, the individual blocks that form an S-Block may be chosen according to a different granularity than at the die level, such as the case when the memory devices include dies that are sub-divided into structures such as planes (i.e., blocks may be taken from individual planes). According to one embodiment, allocation, erasure and garbage collection may be carried out at the S-Block level. In other embodiments, the FMS may perform data operations according to other logical groupings such as pages, blocks, planes, dies, etc.

In turn, each of the Flash blocks 206 comprises a plurality of Flash pages (F-Pages) 208. Each F-Page may be of a fixed size such as, for example, 16 KB. The F-Page, according to one embodiment, is the size of the minimum unit of program for a given Flash device. As also shown in FIG. 2, each F-Page 208 may be configured to accommodate a plurality of physical pages, hereinafter referred to as E-Pages 210. The term "E-Page" refers to a data structure stored in Flash memory on which an error correcting code (ECC) has been applied. According to one embodiment, the E-Page 210 may form the basis for physical addressing within the data storage device and may constitute the minimum unit of Flash read data transfer. The E-Page 210, therefore, may be (but need not be) of a predetermined fixed size (such as 2 KB, for example) and determine the size of the payload (e.g., host data) of the ECC system. According to one embodiment, each F-Page 208 may be configured to fit a predetermined plurality of E-Pages 210 within its boundaries. For example, given 16 KB size F-Pages 208 and a fixed size of 2 KB per E-Page 210, eight E-Pages 210 fit within a single F-Page 208, as shown in FIG. 2. In any event, according to one embodiment, a power of 2 multiple of E-Pages 210, including ECC, may be configured to fit into an F-Page 208. Each E-Page 210 may comprise a data portion 214 and, depending on where the E-Page 210 is located, may also comprise an ECC portion 216. Neither the data portion 214 nor the ECC portion 216 need be fixed in size. The address of an E-Page uniquely identifies the location of the E-Page within the Flash memory. For example, the E-Page's address may specify the Flash channel, a particular die within the identified Flash channel, a particular block within the die, a particular F-Page and, finally, the E-Page within the identified F-Page.

To bridge between physical addressing on the data storage device and logical block addressing by the host, a logical page (L-Page) construct is introduced. An L-Page, denoted in FIG. 2 at reference numeral 212 may comprise the minimum unit of address translation used by the FMS. Each L-Page, according to one embodiment, may be associated with an L-Page number. The L-Page numbers of L-Pages 212, therefore, may be configured to enable the controller 202 to logically reference host data stored in one or more of the physical pages, such as the E-Pages 210. The L-Page 212 may also be utilized as the basic unit of compression. According to one embodiment, unlike F-Pages 208 and E-Pages 210, L-Pages 212 are not fixed in size and may vary in size, due to variability in the compression of data to be stored. Since the compressibility of data varies, a 4 KB amount of data of one type may be compressed into a 2 KB L-Page while a 4 KB amount of data of a different type may be compressed into a 1 KB L-Page, for example. Due to such compression, therefore, the size of L-Pages may vary within a range defined by a minimum compressed size of, for example, 24 bytes to a maximum uncompressed size of, for example, 4 KB or 4 KB+. Other sizes and ranges may be implemented. As shown in FIG. 2, L-Pages 212 need not be aligned with the boundaries of E-Page 210. Indeed, L-Pages 212 may be configured to have a starting address that is aligned with an F-Page 208 and/or E-Page 210 boundary, but also may be configured to be unaligned with either of the boundaries of an F-Page 208 or E-Page 210. That is, an L-Page starting address may be located at a non-zero offset from either the start or ending addresses of the F-Pages 208 or the start or ending addresses of the E-Pages 210, as shown in FIG. 2. As the L-Pages 212 are not fixed in size and may be smaller than the fixed-size E-Pages 210, more than one L-Page 212 may fit within a single E-Page 210. Similarly, as the L-Pages 212 may be larger in size than the E-Pages 210, L-Pages 212 may span more than one E-Page, and may even cross the boundaries of F-Pages 210, shown in FIG. 2 at numeral 217.

For example, where the LBA size is 512 or 512+bytes, a maximum of, for example, eight sequential LBAs may be packed into a 4 KB L-Page 212, given that an uncompressed L-Page 212 may be 4 KB to 4 KB+. It is to be noted that, according to one embodiment, the exact logical size of an L-Page 212 is unimportant as, after compression, the physical size may span from few bytes at minimum size to thousands of bytes at full size. For example, for 4 TB SSD device, 30 bits of addressing may be used to address each L-Page 212 to cover for an amount of L-Pages that could potentially be present in such a SSD.

Figure 3:
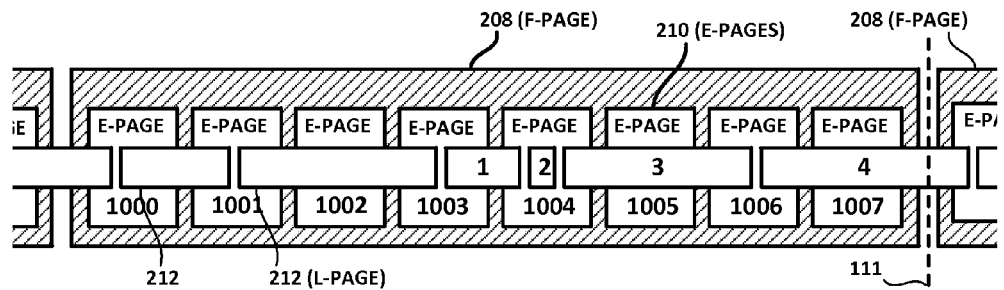
FIG. 3 shows a volatile memory of a data storage device according to one embodiment and a logical-to-physical address translation map and illustrative entries thereof, according to one embodiment.
Figure 3:
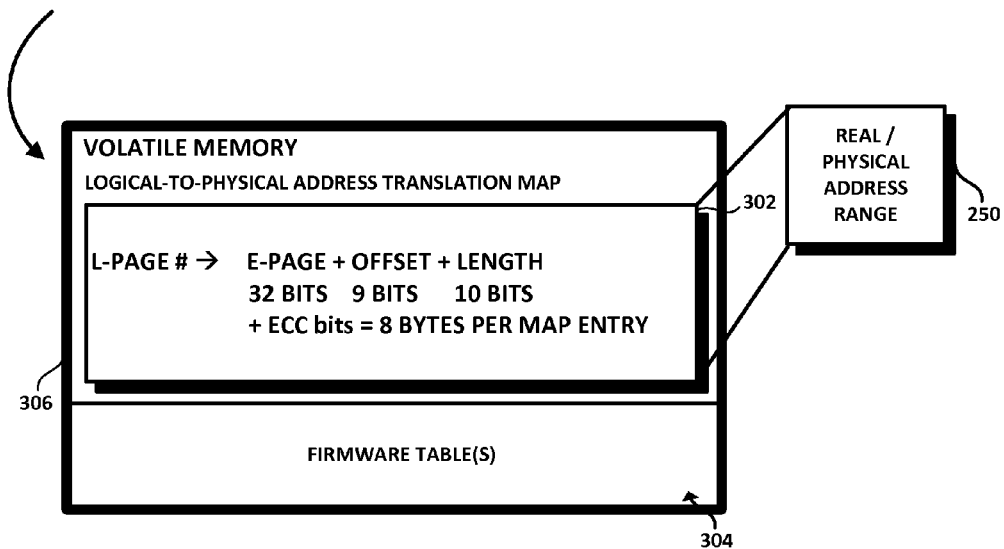

FIG. 3 shows a volatile memory 306 of a data storage device according to one embodiment. The volatile memory 306 may be configured, according to one embodiment, to store a logical-to-physical address translation map 302. As the host data is referenced by the host in L-Pages 212 and as the data storage device stores the L-Pages 212 in one or more contiguous E-Pages 210, a logical-to-physical address translation map is required to enable the controller 202 to associate an L-Page number of an L-Page 212 to one or more E-Pages 210. Such a logical-to-physical address translation map 302, in one embodiment, is a linear array having one entry per L-Page 212. Such a logical-to-physical address translation map 302 may be stored in a volatile memory 306, such as a DRAM, SRAM or DDR. FIG. 3 also shows the entries in the logical-to-physical address translation map 302 for four different L-Pages 212, which L-Pages 212 in FIG. 3 are associated with L-Page numbers denoted as L-Page 1, L-Page 2, L-Page 3 and L-Page 4. According to one embodiment, each L-Page stored in the data storage device may be pointed to by a single and unique entry in the logical-to-physical address translation map 302. Accordingly, in the example being developed herewith, four entries are shown.

As shown at 302, each entry in the map 302 may comprise information for an L-Page that is indexed by an L-Page number. That information may comprise an identification of the physical page (e.g., E-Page) containing the start address of the L-Page being referenced, the offset of the start address within the physical page (e.g., E-Page) and the length of the L-Page. In addition, a plurality of ECC bits may provide error correction functionality for the map entry. For example, and as shown in FIG. 3, and assuming an E-Page size of 2 KB, L-Page 1 may be referenced in the logical-to-physical address translation map 302 as follows: E-Page 1003, offset 800, length 1624, followed by a predetermined number of ECC bits (not shown). That is, in physical address terms, the start of L-Page 1 is within (not aligned with) E-Page 1003, and is located at an offset from the starting physical location of the E-Page 1003 that is equal to 800 bytes. Compressed L-Page 1, furthermore, extends 1,624 bytes, thereby crossing an E-Page boundary to E-Page 1004. Therefore, E-Pages 1003 and 1004 each store a portion of the L-Page 212 denoted by L-Page number L-Page 1. Similarly, compressed L-Page referenced by L-Page number L-Page 2 is stored entirely within E-Page 1004, and begins at an offset therein of 400 bytes and extends only 696 bytes within E-Page 1004. Compressed L-Page associated with L-Page number L-Page 3 starts within E-Page 1004 at an offset of 1,120 bytes and extends 4,096 bytes past E-Page 1005 and into E-Page 1006. Therefore, the L-Page associated with L-Page number L-Page 3 spans a portion of E-Page 1004, all of E-Page 1005 and a portion of E-Page 1006. Finally, the L-Page associated with L-Page number L-Page 4 begins within E-Page 1006 at an offset of 1,144 bytes, and extends 3,128 bytes to fully span E-Page 1007, cross an F-Page boundary into E-Page 1008 of the next F-Page. In one embodiment, there may be 24 bytes (as reflected in the example being developed) of metadata included in each L-Page that are not included in the length specified. In other embodiments, the metadata may be included in the L-Page length.

Collectively, each of these constituent identifier fields (E-Page, offset, length and ECC) making up each entry of the logical-to-physical address translation map 302 may be, for example, 8 bytes in size. That is, for an exemplary 4 TB drive, the address of the E-Page may be 32 bits in size, the offset may be 12 bits (for E-Page data portions up to 4 KB) in size, the length may be 10 bits in size and the ECC field may be provided. Other organizations and bit-widths are possible. Such an 8 byte entry may be created each time an L-Page is written or modified, to enable the controller 202 to keep track of the host data, written in L-Pages, within the flash storage. This 8-byte entry in the logical-to-physical address translation map 302 may be indexed by an L-Page number or LPN. In other words, according to one embodiment, the L-Page number functions as an index into the logical-to-physical address translation map 302. It is to be noted that, in the case of a 4 KB sector size, the LBA is the same as the LPN. The LPN, therefore, may constitute the address of the entry within the volatile memory 306. When the controller 202 receives a read command from the host 218, the LPN may be derived from the supplied LBA and used to index into the logical-to-physical address translation map 302 to extract the location of the data to be read in the flash memory. When the controller 202 receives a write command from the host, the LPN may be constructed from the LBA and the logical-to-physical address translation map 302 may be modified. For example, a new entry therein may be created. Depending upon the size of the volatile memory 306 storing the logical-to-physical address translation map 302, the LPN may be stored in a single entry or broken into, for example, a first entry identifying the E-Page containing the starting address of the L-Page in question (plus ECC bits) and a second entry identifying the offset and length (plus ECC bits). According to one embodiment, therefore, these two entries may together correspond and point to a single L-Page within the flash memory. In other embodiments, the specific format of the logical-to-physical address translation map entries may be different from the examples shown above.

S-Journals and S-Journal Map

As the logical-to-physical address translation map 302 may be stored in volatile memory 306, it may need to be rebuilt upon startup or any other loss of power to the volatile memory 306. This, therefore, requires some mechanism and information to be stored in a non-volatile memory that will enable the controller 202 to reconstruct the logical-to-physical address translation map 302 before the controller can "know" where the L-Pages are stored in the non-volatile memory after startup or after a power-fail event. According to one embodiment, such mechanism and information are embodied in a construct that may be called a System Journal, or S-Journal. According to one embodiment, the controller 202 may be configured to maintain, in the plurality of non-volatile memory devices (e.g., in one or more of the blocks 206 in one or more die, channel or plane), a plurality of S-Journals defining physical-to-logical address correspondences. According to one embodiment, each S-Journal covers a predetermined range of physical pages (e.g., E-Pages).

According to one embodiment, each S-Journal may comprise a plurality of journal entries, with each entry being configured to associate one or more physical pages, such as E-Pages, to the L-Page number of each L-Page. According to one embodiment, each time the controller 202 restarts or whenever the logical-to-physical address translation map 302 is to be rebuilt either partially or entirely, the controller 202 reads the S-Journals and, from the information read from the S-Journal entries, rebuilds the logical-to-physical address translation map 302.

Figure 4:
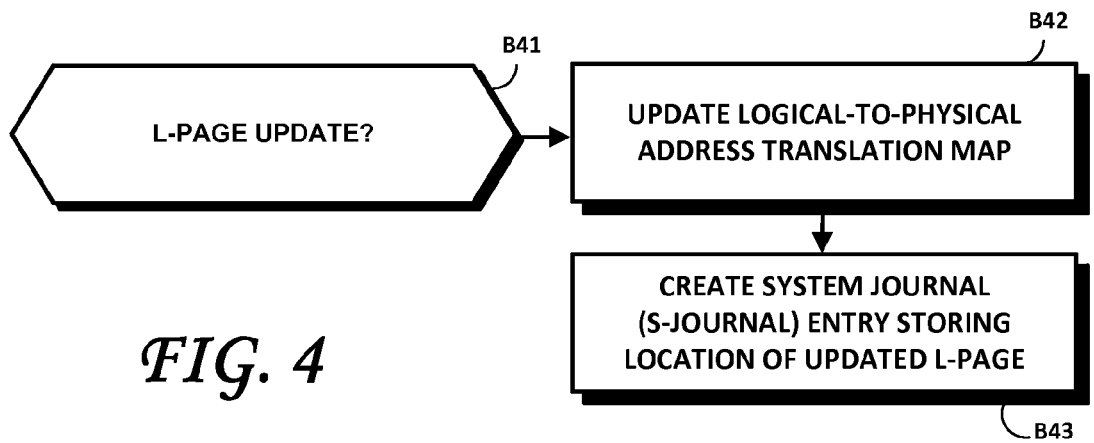
FIG. 4 shows aspects of a method for updating a logical-to-physical address translation map and for creating an S-Journal entry, according to one embodiment.

FIG. 4 shows aspects of a method for updating a logical-to-physical address translation map and for creating an S-Journal entry, according to one embodiment. As shown therein, to ensure that the logical-to-physical address translation map 302 is kept up-to-date, whenever an L-Page is written or otherwise updated as shown at block B41, the logical-to-physical address translation map 302 may be updated as shown at B42. As shown at B43, an S-Journal entry may also be created, storing therein information pointing to the location of the updated L-Page. In this manner, both the logical-to-physical address translation map 302 and the S-Journals are updated when new writes occur (e.g., as the host issues writes to non-volatile memory, as garbage collection/wear leveling occurs, etc.). Write operations to the non-volatile memory devices to maintain a power-safe copy of address translation data may be configured, therefore, to be triggered by newly created journal entries (which may be just a few bytes in size) instead of re-saving all or a portion of the logical-to-physical address translation map, such that Write Amplification (WA) is reduced. The updating of the S-Journals ensures that the controller 202 can access a newly updated L-Page and that the logical-to-physical address translation map 302 may be reconstructed upon restart or other information-erasing power event affecting the volatile memory 306 in which the logical-to-physical address translation map is stored. Moreover, in addition to their utility in rebuilding the logical-to-physical address translation map 302, the S-Journals are useful in enabling effective Garbage Collection (GC). Indeed, the S-Journals may contain the last-in-time update to all L-Page numbers, and also may contain stale entries, entries that do not point to a valid L-Page.

Figure 7:
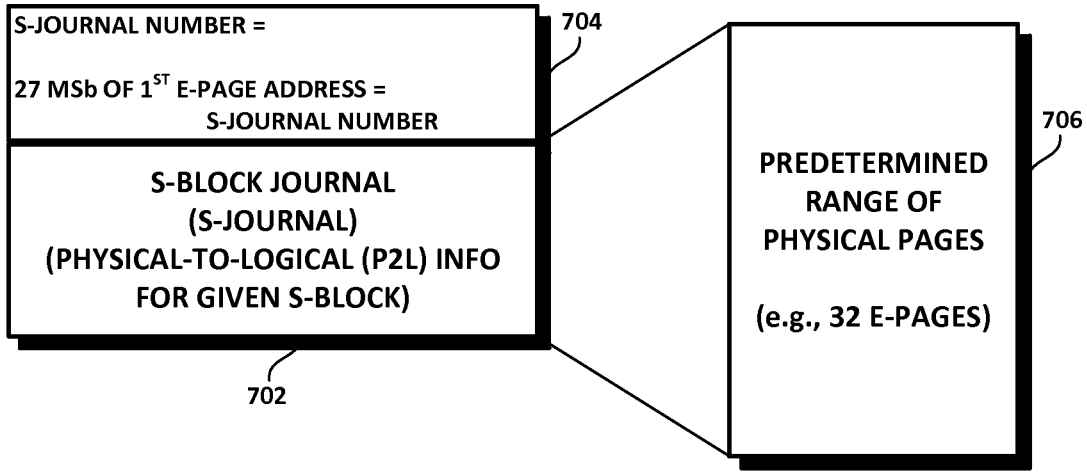
FIG. 7 is a block diagram of an S-Journal, according to one embodiment.

According to one embodiment, the S-Journal may be the main flash management data written to the non-volatile memory. S-Journals may contain mapping information for a given S-Block and may contain the Physical-to-Logical (P2L) information for a given S-Block. FIG. 7 is a block diagram showing aspects of an S-Journal, according to one embodiment. As shown therein, each S-Journal 702 covers a predetermined physical region of the non-volatile memory such as, for example, 32 E-Pages as shown at 706, which are addressable using 5 bits. Each S-Journal 702 may be identified by an S-Journal Number, which may be part of a header 704 that could include other information about the S-Journal. The S-Journal Number may comprise a portion of the address of the first physical page covered by the S-Journal. For example, the S-Journal Number of S-Journal 702 may comprise, for example, the 27 Most Significant Bits (MSb) of the first E-Page address covered by this S-Journal 702.

Figure 8:
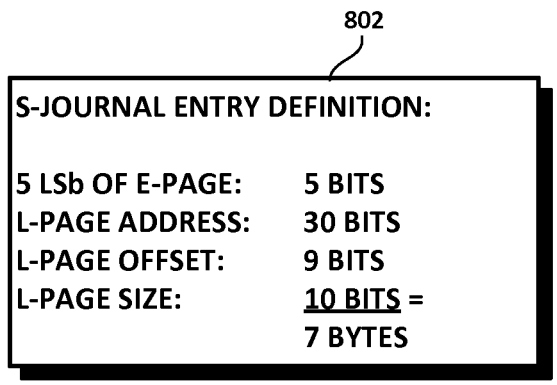
FIG. 8 shows an exemplary organization of one entry of an S-Journal, according to one embodiment.

FIG. 8 shows an exemplary organization of one entry 802 of an S-Journal 702, according to one embodiment. Each entry 802 of the S-Journal 702 may point to the starting address of one L-Page, which is physically addressed in E-Pages. Each entry 802 may comprise, for example, a number (5, for example) of Least Significant Bits (LSbs) of the address of the E-Page containing the start L-Page. The full E-Page address is obtained by concatenating these 5 LSbs with the 27 MSbs of the S-Journal Number in the header 704.

In addition, the entry 802 may comprise the L-Page number, its offset within the identified E-Page and its size. For example, each entry 802 of an S-Journal may comprise the 5 LSbs of the address of first E-Page covered by this S-Journal entry, 30 bits of L-Page number, 9 bits of E-Page offset and 10 bits of L-Page size, adding up to an overall size of about 7 bytes. Various other internal journal entry formats may be used in other embodiments.

According to one embodiment, due to the variability in the compression or the host configuration of the data stored in L-Pages, a variable number of L-Pages may be stored in a physical area, such as a physical area equal to 32 E-Pages, as shown at 706. As a result of the use of compression and the consequent variability in the sizes of L-Pages, S-Journals may comprise a variable number of entries. For example, according to one embodiment, at maximum compression, an L-Page may be 24 bytes in size and an S-Journal may comprise over 2,500 entries, referencing an equal number of L-Pages, one L-Page per S-Journal entry 802.

Figure 9:
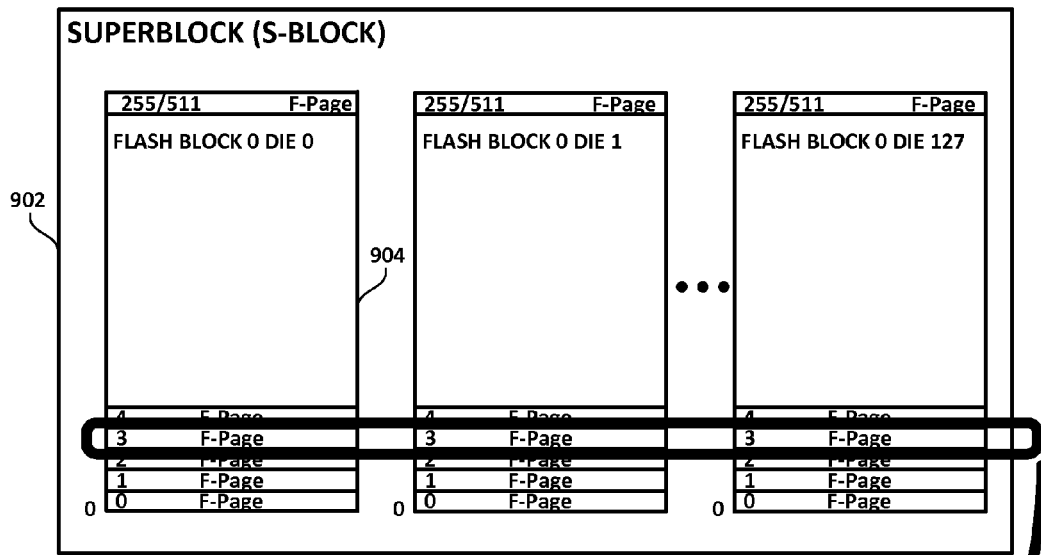
FIG. 9 is a block diagram of a superblock (S-Block), according to one embodiment.
Figure 10:
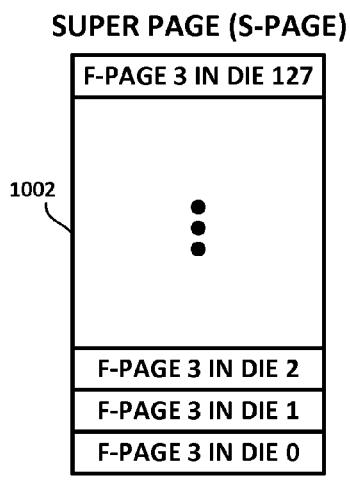
FIG. 10 shows another view of a super page (S-Page), according to one embodiment.

As noted above, an S-Journal may be configured to contain mapping information for a given S-Block. More precisely, according to one embodiment, S-Journals contain the mapping information for a predetermined range of E-Pages within a given S-Block. FIG. 9 is a block diagram of an S-Block, according to one embodiment. As shown therein, an S-Block 902 may comprise one flash block (F-Block) 904 (as also shown at 206 in FIG. 2) per die. An S-Block, therefore, may be thought of as a collection of F-Blocks, one F-Block per die, that are combined together to form a unit of the Flash Management System. According to one embodiment, allocation, erasure and GC may be managed at the S-Block level. Each F-Block 904, as shown in FIG. 9, may comprise a plurality of flash pages (F-Page) such as, for example, 256 or 512 F-Pages. An F-Page, according to one embodiment, may be the size of the minimum unit of program for a given non-volatile memory device. FIG. 10 shows a super page (S-page), according to one embodiment. As shown therein, an S-Page 1002 may comprise one F-Page per F-Block of an S-Block, meaning that an S-Page spans across an entire S-Block.

Relationships Among Various Data Structures

Figure 11A:
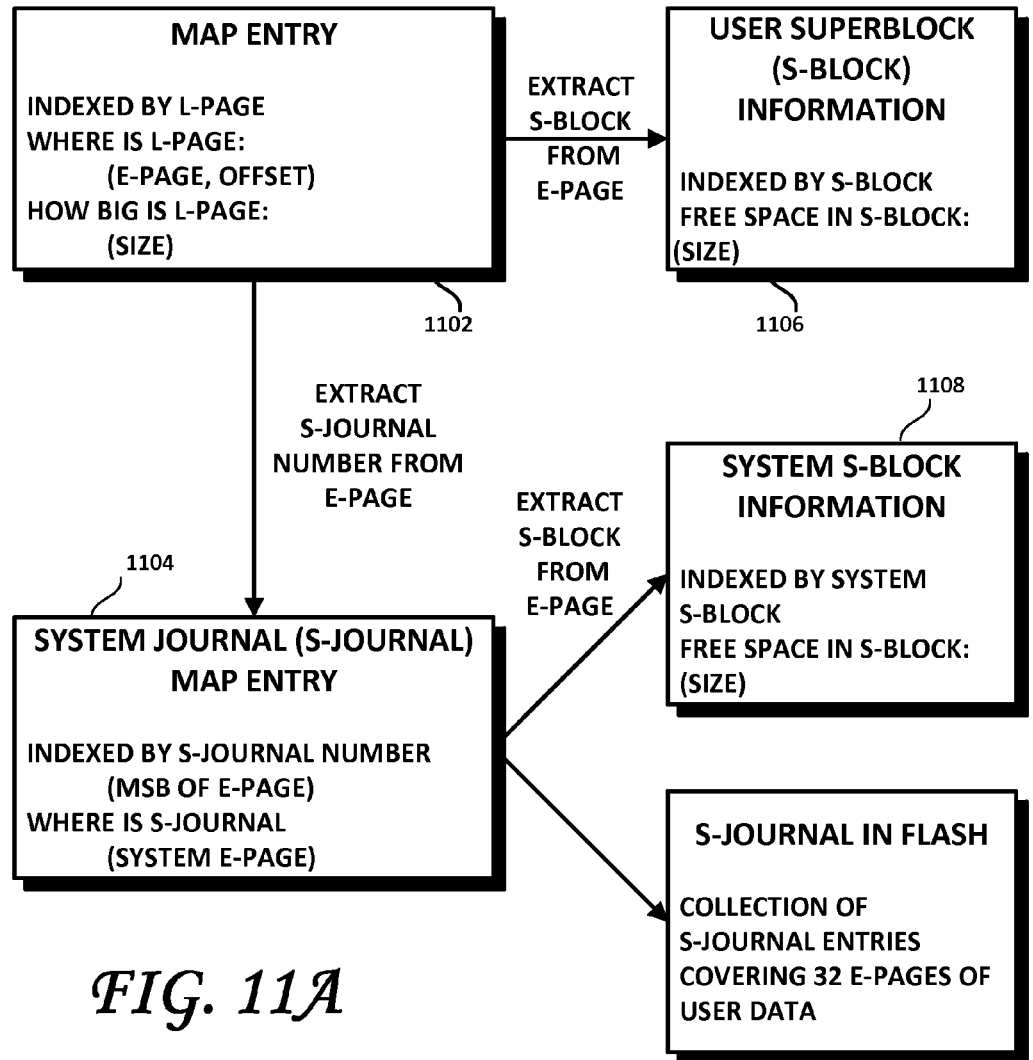
FIG. 11A shows relationships among the logical-to-physical address translation map, S-Journals and S-Blocks, according to one embodiment.

FIG. 11A shows relationships among the logical-to-physical address translation map, the S-Journal map and S-Blocks, according to one embodiment. Reference 1102 denotes an entry in the logical-to-physical address translation map (stored in DRAM in one embodiment). According to one embodiment, the logical-to-physical address translation map may be indexed by L-Page number, in that there may be one entry 1102 per L-Page in the logical-to-physical address translation map. The physical address of the start of the L-Page in the flash memory and the size thereof may be given in the map entry 1102; namely by E-Page address, offset within the E-Page and the size of the L-Page. As noted earlier, the L-Page, depending upon its size, may span one or more E-Pages and may span F-Pages and F-Blocks as well.

As shown at 1104, the volatile memory (e.g., DRAM) may also store a System Journal (S-Journal) map. An entry 1104 in the S-Journal map stores information related to where an S-Journal is physically located in the non-volatile memory. For example, the 27 MSbs of the E-Page physical address where the start of the L-Page is stored may constitute the S-Journal Number (as previously shown in FIG. 7). The S-Journal map entry 1104 in the volatile memory may also include the address of the S-Journal in non-volatile memory, referenced in system E-Pages. From the S-Journal map entry 1104 in volatile memory, System S-Block Information 1108 may be extracted. The System S-Block Information 1108 may be indexed by System S-Block (S-Block in the System Band) and may comprise, among other information regarding the S-Block, the size of any free or used space in the System S-Block. Also from the S-Journal map entry 1104, the physical location (expressed in terms of E-Pages in the System Band) of the referenced S-Journal in non-volatile memory 1110 may be extracted.

The System Band, according to one embodiment, does not contain L-Page data and may contain File Management System (FMS) meta-data and information. The System Band may be configured as lower page only for reliability and power fail simplification. During normal operation, the System Band need not be read except during garbage collection. The System Band may be provided with significantly higher overprovisioning than the data band for overall WA optimization. Other bands include the Hot Band, which may contain L-Page data and may be frequently updated, and the Cold Band, which may be less frequently updated and may comprise more static data, such as data that may have been collected as a result of GC. According to one embodiment, the System, Hot and Cold Bands may be allocated by an S-Block basis.

As noted above, each of these S-Journals in non-volatile memory may comprise a collection of S-Journal entries and cover, for example, 32 E-Pages worth of data. These S-Journals in non-volatile memory 1110 enable the controller 202 to rebuild not only the logical-to-physical address translation map in volatile memory, but also the S-Journal map, the User S-Block Information 1106, and the System S-Block Information 1108, in volatile memory.

Figure 11B:
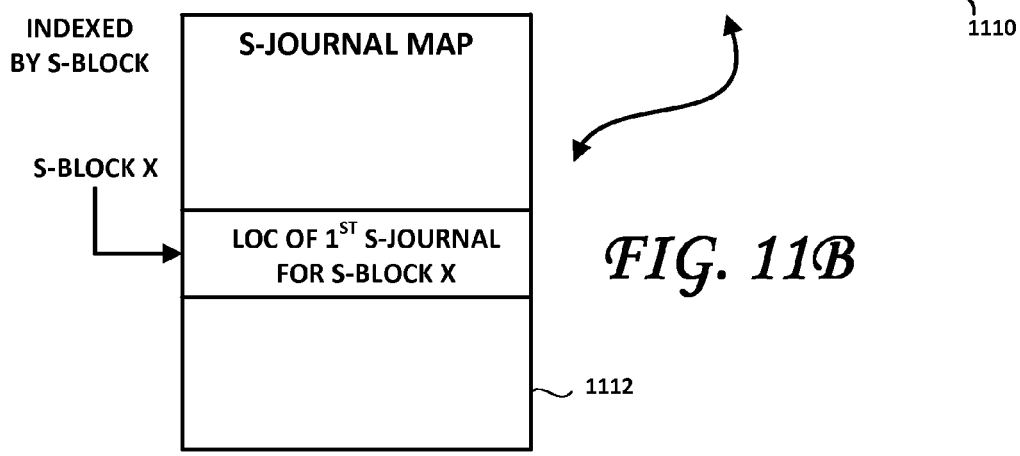
FIG. 11B is a block diagram of an S-Journal Map, according to one embodiment.

FIG. 11B is a block diagram of an S-Journal Map 1112, according to one embodiment. The S-Journal Map 1112 may be indexed by S-Block number and each entry thereof may point to the start of the first S-Journal for that S-Block which, in turn, may cover a predetermined number of E-Pages (e.g., 32) of that S-Block. The controller 202 may be further configured to build or rebuild a map of the S-Journals and store the resulting S-Journal Map in volatile memory. That is, upon restart or upon the occurrence of another event in which power fails or after a restart subsequent to error recovery, the controller 202 may read the plurality of S-Journals in a predetermined sequential order, build a map of the S-Journals stored in the non-volatile memory devices based upon the sequentially read plurality of S-Journals, and store the built S-Journal Map 1112 in the volatile memory.

Firmware Table and Firmware Journals

Figure 5:
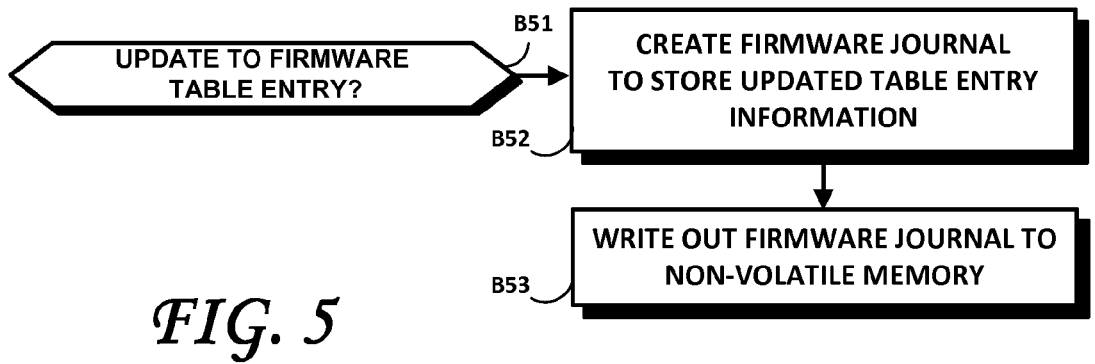
FIG. 5 shows aspects of a method for updating a firmware table entry, according to one embodiment.

If power is interrupted to the volatile memory 306 for any reason, the controller 202 may also need to rebuild the firmware tables 304 (shown in FIG. 3) stored in the volatile memory 306. Such firmware tables 304 may, for example, store Program/Erase (PE) count information for S-Blocks or may save non-volatile memory defect information. FIG. 5 shows aspects of a method for updating the firmware tables and for creating a Firmware Journal, according to one embodiment. According to one embodiment, the S-Journal mechanism described above may be adapted to store the contents of the firmware tables 304 in non-volatile memory, so as to enable the subsequent reconstruction of the firmware tables 304 in the volatile memory 306 after startup or whenever the volatile memory 306 is erased or deemed not trusted. As shown in FIG. 5, Block B51 calls for determining whether an entry (e.g., a row) of a firmware table has been updated. Thereafter, to ensure that a power-safe version of this update is kept, a Firmware Journal may be created, in a volatile buffer for eventual storage in non-volatile memory, for example, to store at least the updated firmware table entry information, as shown at B52. An address of the firmware table in volatile memory 306 may also be stored in the Firmware Journal. Thereafter, the created Firmware Journal may be written out to non-volatile memory, as shown at B53.

Figure 6:
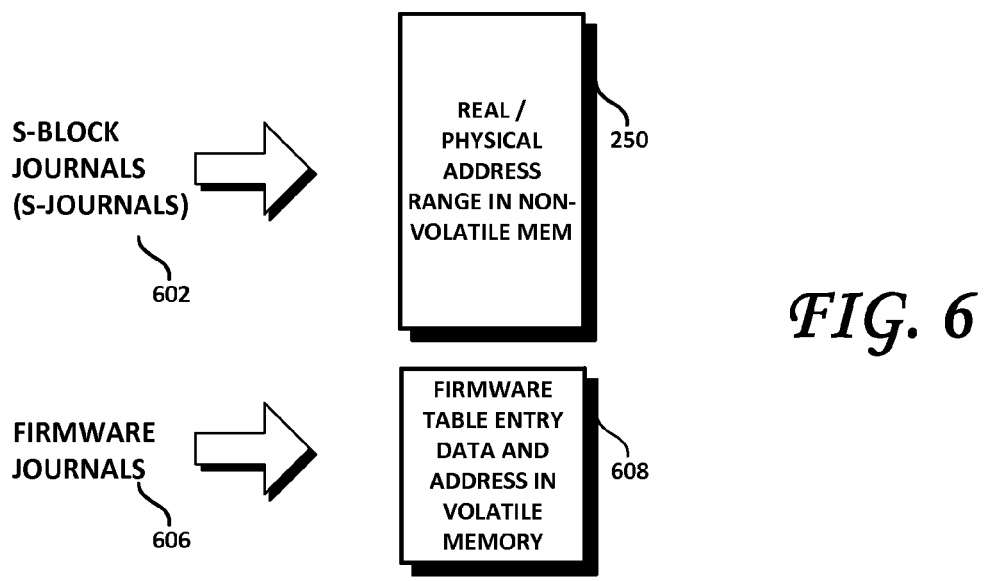
FIG. 6 is a diagram showing the coverage of S-Journals over a physical address range and the contents of Firmware Journals, according to one embodiment.

FIG. 6 is a diagram showing the coverage of S-Journals over a physical address range as well as the contents of Firmware Journals, according to one embodiment. As shown therein, the S-Journals 602 may be configured to store information for L-pages of non-zero length that are stored at physical pages within a physical address range 250. Finally, the Firmware Journals 606 may each store firmware table entry information and length, as well as an address in volatile memory of the entry in the associated firmware table, as shown at 608. According to one embodiment, the physical address range 250 may span, for example, 32 or 64 million addresses. In contrast, the firmware address range 608 may span only 10,000 entries or so. It is understood, however, that both the sizes of each and the relative sizes of the physical address range and the number of firmware table entries may vary according to the implementation, and that these sizes are only given for illustrative purposes. According to one embodiment, the allocation of these (and optionally, other) address ranges may be allocated by the controller 202 at runtime.

Firmware Journal Format

Figure 12:
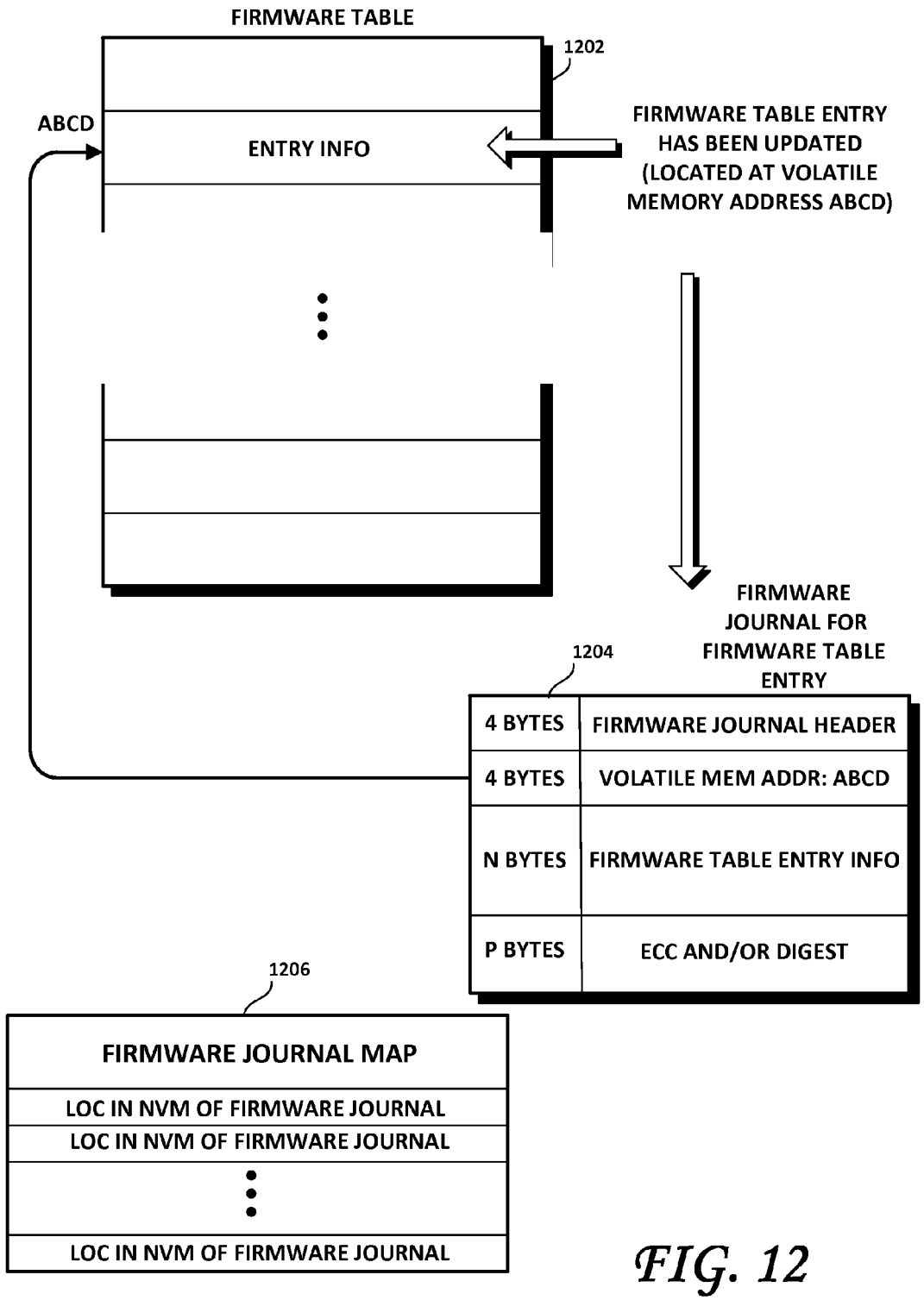
FIG. 12 is a block diagram illustrating aspects of a method of updating a firmware table in an SSD, according to one embodiment.

FIG. 12 is a block diagram illustrating aspects of a method of updating a firmware table in a data storage device, according to one embodiment. An exemplary firmware table is shown in FIG. 12 at reference 1202. For example, this firmware table 1202 may comprise a plurality of records. For example, the firmware table may comprise 2,048 8-byte records, for a total size of 16 KB. For example, the firmware table 1202 may comprise one entry per block 206 or may comprise other system-related information such as number of power-on cycles, number of commands processed and/or other firmware-derived information. In the example being developed in FIG. 12, the firmware may need to update the firmware table 1202 to store therein a new firmware table entry (such as an updated PE count) at exemplary address ABCD within the volatile memory 306. Rather than making a copy of the entire updated firmware table 1202 and storing the same in non-volatile memory, one embodiment comprises generating a Firmware Journal (and an entry therein) for and corresponding to the changed entry in the firmware table 1202. The Firmware Journal extends the S-Journal concepts described above and operates in a similar fashion except it is specifically adopted to handle updates to firmware tables. Therefore, the support mechanisms for S-Journal processing such as reconstruction and coherency can be leveraged in the processing of Firmware Journals.

For example, as an S-Journal contains header information, a Firmware Journal 1204 may also comprise a Firmware Journal header. The Firmware Journal header may constitute an index into a Firmware Journal map 1206 whose entries, indexed by Firmware Journal number, may specify the location, in the non-volatile memory (NVM) of the corresponding Firmware Journal. According to one embodiment, the Firmware Journal map 1206 may be configured to be physically and/or logically separate from the S-Journal map 1112. Alternatively, according to one embodiment, the Firmware Journal map 1206 may form an integral part of the S-Journal map 1112 shown in FIG. 11 and the entries thereof may be handled in a similar manner as are the entries of the S-Journal map 1112. The Firmware Journal map 1206 is shown as a separate construct in FIG. 12 for ease of reference only, it being understood that the S-Journal map 1112 of FIG. 11B may also comprise entries corresponding to firmware tables. For example and similarly to the S-Journal header, the Firmware Journal header may comprise a Firmware Journal number and a length, in bytes. In one embodiment, the Firmware Journal header may be 4 bytes in size. The Firmware Journal 1204 may also comprise the complete address in the volatile memory 306 of the updated firmware table entry. In the example of FIG. 12, such complete address is ABCD, which is the address, in the volatile memory 306, of the entry within the firmware table 1202. Thirty-two (32) bits or 4 bytes (for example) may be used to specify the complete address in volatile memory 306 of the changed entry in the firmware table 1202. The next field of the Firmware Journal 1204 may store the firmware table entry information itself. That is, this field may store the updated value (i.e., the record to be saved in the Firmware Journal) to be stored at address ABCD in the volatile memory 306. For example, this field may be variably-sized, as suggested by the "N Bytes" size of this entry in the Firmware Journal 1204. Lastly, the Firmware Journal 1204 may comprise P bytes of error correction code and/or a digest, such as a cyclic redundancy code (CRC). For example, the error correction code/digest may span 4 bytes. It is understood that the fields and sizes in bytes shown in FIG. 12 are but exemplary in nature. Different implementations of Firmware Journals may well comprise a greater or lesser number of fields, each of which may span different byte sizes. After the Firmware Journal 1204 is created, it may be written out to non-volatile memory, so as to store a power-safe copy thereof in non-volatile memory.

According to one embodiment, including the full memory address of the updated firmware table entry enables the controller 202 to reconstruct the firmware table(s) when the Firmware Journals are accessed and read at power-up. According to one embodiment, each created Firmware Journal may be identified by a Firmware Journal number. According to one embodiment, such Firmware Journal number may be included in the Firmware Journal header of the Firmware Journal 1204. According to one embodiment, the created Firmware Journal may be stored in physical non-volatile memory at an address specified by the Firmware Journal header. If, for example, the full physical address range of the non-volatile memory is addressed using 32 bits, a 4 byte Firmware Journal header may serve as a complete address in non-volatile memory where the Firmware Journal 1204 may be stored. Such Firmware Journal headers, one per created Firmware Journal 1204, may also be stored in a Firmware Journal map (which may be a part of the S-Journal map 1112 of FIG. 11B), as shown at reference numeral 1206 in FIG. 12.

The Firmware Journal map 1206 (whether physically and/or logically separate from the S-Journal map 1112 or integrated therewith) may also be written out to non-volatile memory, to enable the controller 202, with reference to the Firmware Journal map 1206, to access each of the created Firmware Journals 1204 at power-up, by scanning each Firmware Journal in a System Band. The System Band, according to one embodiment, is a portion, which may be allocated at runtime by the controller 202, within the non-volatile memory, where such S-Journals and Firmware Journals may be stored. According to one embodiment, the S-Journals and the Firmware Journals in the System Band may be scanned in the order in which they were generated. From the firmware table entry information and the address and size information extracted from the read Firmware Journals, the firmware table(s) (such as shown at 1202) may be rebuilt in volatile memory 306. This process enables the firmware tables 304 (FIG. 3) in volatile memory 306 to be rebuilt/reconstructed/re-populated using a similar process as was used to rebuild the logical-to-physical address translation map 302 in volatile memory. According to one embodiment, both the S-Journals 702 and the Firmware Journals 1204 stored in non-volatile memory may be scanned in the order in which they were created, to thereby reconstruct both the address translation map 302 and the firmware tables 304.

A Firmware Journal may comprise information identifying the journal as a Firmware Journal that is configured to store firmware data, thereby differentiating the Firmware Journals scanned upon startup from the S-Journals used for user data. For example, a flag bit may be set in the Firmware Journal header identifying the journal as a Firmware Journal configured to store, for example, 8 byte-aligned information, as opposed to, for example, 7 byte S-Journals. Such Firmware Journals, according to one embodiment, may be configured to provide an effective mechanism to enable the controller 202 to store virtually any (e.g., 8-byte aligned in this example) information to volatile memory, while maintaining a power safe copy thereof in non-volatile memory. According to one embodiment, the created Firmware Journal may be variable in size and need not be limited to the exemplary implementation shown in FIG. 12. Therefore, the structure of the Firmware Journals 1204 enables them, according to one embodiment, to be scanned and processed to reconstruct the firmware tables in a similar manner as are the S-Journals that are also scanned and processed at start-up, to reconstruct the logical-to-physical address translation map 302. As the content, size and complete address in volatile memory 306 of the firmware table entry information may be specified in the Firmware Journal 1204, the controller 202 may write such firmware table entry information directly to the complete volatile memory address specified in the Firmware Journal, to thereby efficiently reconstruct the firmware table(s) stored in the volatile memory 306.

It is possible, and even likely, that a single entry in a given Firmware Journal may be updated multiple times over a period of time. According to one embodiment, each update of the given Firmware Journal may generate a new Firmware Journal, which newly-created Firmware Journal may be written out to the non-volatile memory. In this manner, the Firmware Journals for a given firmware table may collectively constitute a history of updates to the firmware table over time. In sequentially scanning such Firmware Journals in the order in which they were generated, the scanning process may encounter multiple Firmware Journals associated with the same firmware table entry. According to one embodiment, therefore, as between an earlier-generated Firmware Journal associated with a given firmware table entry and a latest-generated Firmware Journal associated with the given firmware table entry, only the latest-generated Firmware Journal comprises valid firmware table entry information.

According to one embodiment, when a firmware table entry is updated and a new Firmware Journal corresponding thereto is created and written out to non-volatile memory, there is a recently obsoleted Firmware Journal in non-volatile memory and a new, valid Firmware Journal containing the updated firmware table entry information. In this case, the controller 202 may update the free space accounting of the non-volatile memory (e.g., of the S-Block storing the recently obsoleted Firmware Journal) by an amount corresponding to the size of the obsolete Firmware Journal. That S-Block containing such free space may, at some later point in time, be garbage collected and the space therein made available for future writes to the non-volatile memory.

Firmware Table Reconstruction

Figure 13:
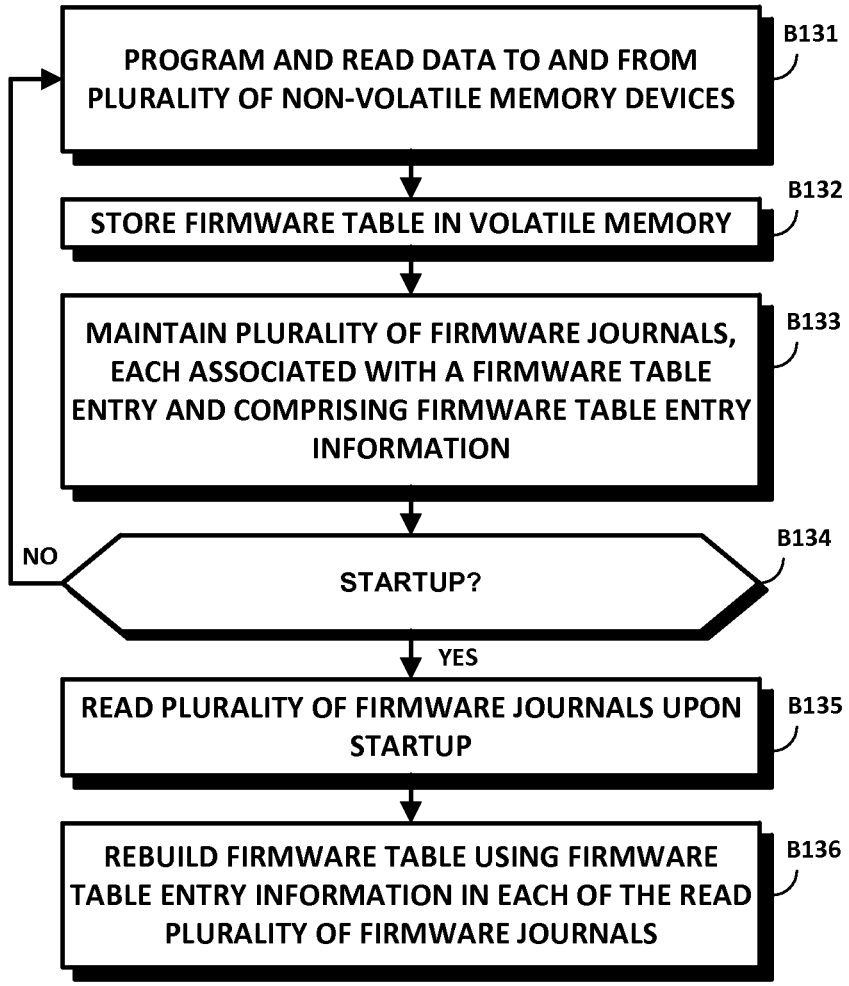
FIG. 13 is flowchart of a method of controlling a data storage device, according to one embodiment.

FIG. 13 is a flowchart of a method of controlling a data storage device, according to one embodiment. Indeed, one embodiment is a method of controlling a data storage device comprising a volatile memory and a plurality of non-volatile memory devices. Each of the plurality of non-volatile devices may be configured to store a plurality of physical pages, each being stored at a predetermined physical location (such as an E-Page, for example) within the plurality of non-volatile devices. The method may comprise programing and reading data to and from the plurality of memory devices, as shown at Block B131 in FIG. 13. As shown at Block B132, one or more firmware tables may be stored in volatile memory. The firmware table(s) may comprise a plurality of firmware table entries, each stored at a predetermined address in the volatile memory 306. As shown at Block B133, the method may also comprise maintaining a plurality of Firmware Journals in the plurality of non-volatile memory devices, with each Firmware Journal being associated with a firmware table entry and comprising firmware table entry information, as shown and described relative to FIG. 12. This may include generating new Firmware Journals as updates to firmware table entries are made.

At B134, it may be determined whether a startup or other event that would erase the contents of the volatile memory 306 has occurred. If not, (NO branch of B134), the method may revert to Block B131, as the controller 202 continues to process host access requests and/or continues to carry out various housekeeping duties, such as garbage collecting. If a startup, reset or other event that would erase or otherwise corrupt the contents of the volatile memory 306 has occurred (YES branch of B134), the plurality of Firmware Journals may be accessed and read, as shown at B135. For example, an address range within the non-volatile memory may be scanned and the journals (comprising, for example, S-Journals, and Firmware Journals) may be read to rebuild the address translation maps (e.g., the logical-to-physical address translation map 302) and the firmware table(s). That is, the firmware table(s) may be rebuilt using the firmware table entry information in each of the sequentially-read plurality of Firmware Journals, as shown at B136. The sequential reading of the stored Firmware Journals in the order in which they were created ensures the coherency of the rebuilt firmware tables; that is, ensures that the firmware tables are populated with only valid firmware table entry information. Such rebuilding may be carried out one firmware table entry at a time or may be carried out by reading in all of the firmware table entry information fields of each of the read Firmware Journals and populating the firmware table(s) with a plurality of sequential writes to the volatile memory 306. The controller 202 "knows" exactly where to store the read firmware table entry information, as each of the Firmware Journals, according to one embodiment, may store a complete address in the volatile memory 306 where the read firmware table entry information is to be written.

Advantageously, the methods and functionality inherent in the Firmware Journals may be used to good advantage by the controller 202 to store most any data to the volatile memory 306 in a power-safe manner. Indeed, the functionality of the Firmware Journals may be extended to arbitrarily store any (e.g., 8 byte-aligned) data to the volatile memory 306 with a power safe copy thereof being stored to the non-volatile memory, through the Firmware Journal mechanism described and shown herein.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual structures (such as, for example, the structure of the SSD blocks or the structure of the physical or logical pages) may differ from those shown in the figures. Moreover, the structure of the Firmware Journals may differ from that shown and described herein, as those of skill in this art may recognize. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device controller, the controller being configured to: (1) couple to a volatile memory and a plurality of non-volatile memory devices configured to store a plurality of physical pages and (2) program data to and read data from the plurality of non-volatile memory devices, the controller being configured to:
store a firmware table comprising a plurality of firmware table entries;
maintain a plurality of firmware journals in the plurality of non-volatile memory devices, each firmware journal being associated with a firmware table entry and comprising firmware table entry information;
read the plurality of firmware journals upon startup; and
rebuild the firmware table using the firmware table entry information in each of the read plurality of firmware journals.

2. The controller of claim 1, wherein each of the plurality of firmware journals is associated with a firmware journal number.

3. The controller of claim 2, wherein the controller is further configured to rebuild the firmware table using the firmware journal number, an address and a length.

4. The controller of claim 1, wherein the controller is further configured to read the plurality of firmware journals in an order in which they were generated.

5. The controller of claim 1, wherein the controller is further configured to, upon a change to a firmware table entry, generate a new firmware journal and to store the generated firmware journal in a non-volatile memory.

6. The controller of claim 5, wherein as between an earlier-generated firmware journal associated with a given firmware table entry and a latest-generated firmware journal associated with the given firmware table entry, only the latest-generated firmware journal comprises valid firmware table entry information.

7. The controller of claim 1, wherein the plurality of firmware journals collectively define a history of changes to the firmware table over time.

8. The controller of claim 1, wherein each firmware journal is configured to store an address, in the volatile memory, of its associated firmware table entry.

9. The controller of claim 1, wherein each firmware journal is configured to store, in the volatile memory, a size of its associated firmware table entry.

10. The controller of claim 1, wherein each firmware journal is configured to store at least one of an error correction code and a digest.

11. The controller of claim 1, wherein the controller is further configured to build a firmware journal map, each entry in the firmware journal map pointing to a location in the non-volatile memory devices where one of the plurality of firmware journals is stored.

12. A data storage device, comprising:
the controller of claim 1, and
the plurality of non-volatile memory devices.

13. A method for controlling a data storage device, the data storage device comprising a volatile memory and a plurality of non-volatile memory devices configured to store a plurality of physical pages and to enable programming data to and reading data from the plurality of non-volatile memory devices, the method comprising:
storing a firmware table comprising a plurality of firmware table entries;
maintaining a plurality of firmware journals in the plurality of non-volatile memory devices, each firmware journal being associated with a firmware table entry and comprising firmware table entry information;
reading the plurality of firmware journals upon startup; and
rebuilding the firmware table using the firmware table entry information in each of the read plurality of firmware journals.

14. The method of claim 13, wherein each of the plurality of firmware journals is associated with a firmware journal number.

15. The method of claim 14, wherein rebuilding further comprises rebuilding the firmware table using the firmware journal number, an address and a length.

16. The method of claim 13, wherein reading comprises reading the plurality of firmware journals in an order in which they were generated.

17. The method of claim 13, further comprising, upon a change to a firmware table entry, generating a new firmware journal and to store the generated firmware journal in a non-volatile memory.

18. The method of claim 17, wherein as between an earlier-generated firmware journal associated with a given firmware table entry and a latest-generated firmware journal associated with the given firmware table entry, only the latest-generated firmware journal comprises valid firmware table entry information.

19. The method of claim 13, wherein the plurality of firmware journals collectively define a history of changes to the firmware table over time.

20. The method of claim 13, wherein maintaining further comprises storing, in each firmware journal, an address in volatile memory of its associated firmware table entry.

21. The method of claim 13, wherein maintaining further comprises storing, in each firmware journal, a size of its associated firmware table entry.

22. The method of claim 13, wherein maintaining further comprises storing, in each firmware journal, at least one of an error correction code and a digest.

23. The method of claim 13, further comprising building a firmware journal map, each entry in the firmware journal map pointing to a location in the non-volatile memory devices where one of the plurality of firmware journals is stored.

* * * * *